Feb. 17, 1953   F. R. GARDNER   2,628,854
QUICK RELEASE LOCKING MECHANISM
Filed July 5, 1949

FRED R. GARDNER
Inventor

By Hubert Miller
Attorney

Patented Feb. 17, 1953

2,628,854

UNITED STATES PATENT OFFICE 2,628,854

QUICK RELEASE LOCKING MECHANISM

Fred R. Gardner, Wichita, Kans.

Application July 5, 1949, Serial No. 103,140

1 Claim. (Cl. 287—58)

This invention relates to an improvement in mechanisms for locking telescoping tubular members in selected relative positions, and for quickly releasing them for movement to newly selected positions, and re-locking them.

It is the chief object of the invention to provide a simple mechanism which will prevent relative movement of two telescoping tubes in either direction without requiring notches or the like in either of the two tubes.

It is another object to provide such a device which does not require any movement of the tubes after they have been placed in the desired relative positions in order to "set" or firmly lock the mechanism.

Another object is to provide a tube locking mechanism which will not scar or bite into the surface of either telescoping tube.

An additional object is to provide a mechanism of this type which does not require the longitudinal slotting of either of the telescoping tubes.

Another object is to provide a locking mechanism which can be adapted to work equally well on telescoping tubes of varying cross sectional shapes, such as square, hexagonal, etc.

The invention will be more clearly understood when the following description is read in connection with the accompanying drawings, in which.

Figure 1:
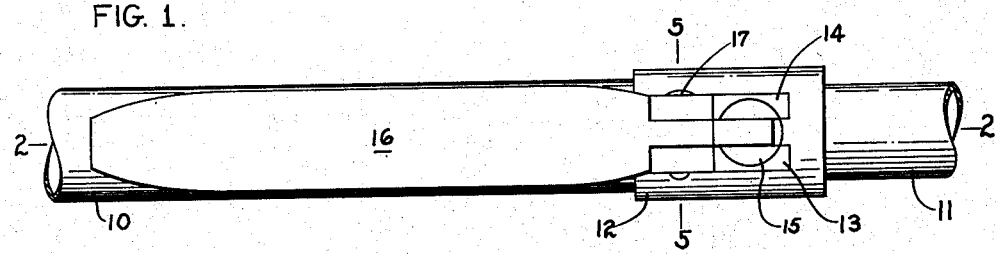
Fig. 1 is a top plan view of a locking mechanism embodying the invention, installed on two telescoping tubes.

Referring to the drawings, the two telescoping tubes are identified by the numerals 10 and 11. A collar 12 is welded or otherwise rigidly secured to one end of the outer tube 10. This collar is provided with a pair of spaced outwardly projecting ears 13 and 14, which lie in planes parallel to the longitudinal tube axis. The adjacent inner surfaces of these ears are drilled out, as clearly shown in Fig. 1, and the drilled hole continues through the collar 12, substantially at right angles to the longitudinal axis thereof, to form a guide for a friction shoe 15 which is slidable axially in the guide hole.

The ears 13 and 14 are provided with transversely alined holes which lie in a position spaced longitudinally from the shoe 15. One of these holes is threaded.

Figure 5:
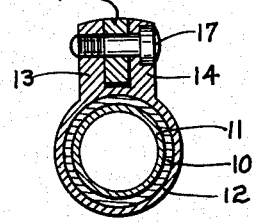
Fig. 5 is a transverse sectional view taken along the line 5—5 of Fig. 1.

A shoe operating lever type handle 16 is pivotally mounted between the ears 13 and 14 on a pivot pin 17, which passes through the alined holes in the ears and has one of its ends threaded and seated in a complementary threaded hole in one ear, as clearly shown in Fig. 5.

Figure 2:
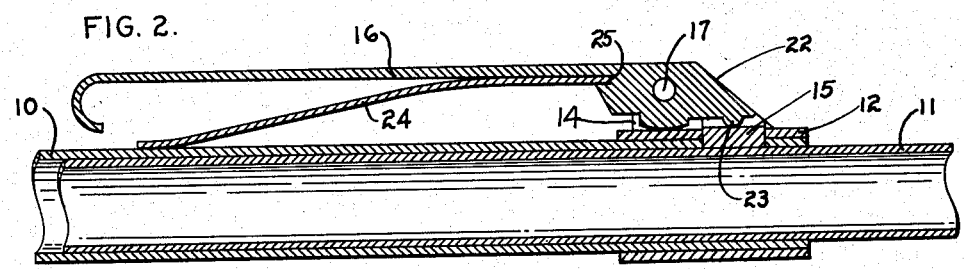
Fig. 2 is a sectional view along the line 2—2 of Fig. 1.
Figure 3:
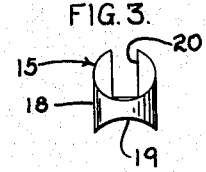
Figs. 3 and 4 are front and side views respectively of a part of the locking mechanism illustrated.
Figure 4:
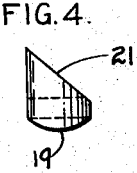

The details in the construction of the shoe are clearly shown in Figs. 3 and 4. Its main body portion 18 is circular in cross section, its bottom surface 19 is concavely arcuate to fit snugly against the outer surface of the inner tube 11, its upper end is slotted, as at 20, to receive the shoe operating end of the lever 16, and its upper end is also truncated at an angle, as at 21 (Fig. 4), to lie substantially in the same plane as the sloping surface 22 (Fig. 2) at the pivoted end of the lever. These last mentioned sloping surfaces are primarily to improve the appearance of the device and are not necessary to its proper functioning.

The lever type handle has an integral laterally disposed semi-cylindrical lug 23 which is positioned to contact the bottom of the slot 20 in the shoe 15. Through this lug the lever serves to apply frictional pressure on the shoe to force its arcuate surface 19 firmly against the adjacent surface of the tube 11. This pressure, substantially at right angles to the longitudinal axis of the tube 11, is provided by a leaf type spring 24, one end of which is seated in a notch 25 in the handle 16, and the other end of which bears against the outer surface of the tube 10, as shown, at a point beneath the opposite end of the handle.

Figure 6:
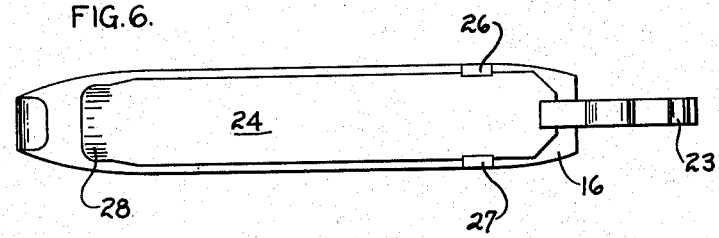
Fig. 6 is a bottom plan view of the locking mechanism release handle and its associated spring.

Integral lugs 26 and 27 (Fig. 6), on the nether surface of the handle 16 seat in appropriately located notches in the opposite side edges of the spring 24, and serve to keep the forward end of the spring centered with relation to the handle 16. The opposite end of the spring 24 is kept centered by being made transversely arcuate as indicated at 28, to fit firmly against the surface of tube 10.

From the construction described, it will be seen that the spring 24 urges the handle 16 in a clockwise direction (as viewed in Fig. 2) about its pivot pin 17, thus applying strong inward pressure on the shoe 15, and urging it into firm frictional contact with the periphery of the tube 11. By encircling the outer tube 10 and the handle 16 with the hand and squeezing, the handle is moved slightly counterclockwise, thus relieving the shoe of pressure, and permitting the tube 11 to slide easily in either direction with relation to the tube 10. When hand pressure on the handle is released the shoe 15 is again moved into frictional contact with the tube 11, locking the two tubes against relative movement. The outer edges of the arcuate portion 19 of the shoe 15 are preferably chamfered slightly and buffed to prevent the shoe from scratching or otherwise marring the surface of the inner tube 11.

Having described the invention with sufficient clarity to enable those familiar with the art to construct and use it, I claim:

A mechanism for frictionally and releasably locking two telescoping members against relative longitudinal movement, the receiving one of said members being tubular, and the inner member being cylindrical and having a smooth outer surface, said mechanisms comprising: a cylindrical sleeve or collar fixed on the outer surface of the receiving member; aligned circular apertures of identical size and shape through said collar and through the wall of the outer telescoping member forming a laterally disposed guideway; a shoe of cylindrical cross section slidably fitting in said guideway for reciprocating movement into and out of contact with the smooth cylindrical surface of the inner telescoping member, the outer end of said shoe projecting outwardly beyond said collar; a bifurcated lever mounting bracket carried by said collar adjacent the aperture therein; a lever pivotally mounted intermediate its ends between the furcations of said bracket the distance from the pivot point to either end of the lever being greater than the distance from the pivot point to the adjacent surface of the outer telescoping member; an interfitting tongue and groove connection between one end of said lever and the outer end of said shoe to prevent shoe rotation in its guideway; and an elongated curved leaf spring having one end secured to said lever adjacent its pivot point, the opposite end of said spring being curved toward and into free sliding contact with the exterior surface of the outer telescoping member at a point remote from said pivot point, an intermediate portion of said spring contacting an intermediate portion of the lever and urging it to pivot outward in a direction to force the shoe contacting end of the lever against the outer end of said shoe.

FRED R. GARDNER.

REFERENCES CITED

The following references are of record in the file of this patent:

UNITED STATES PATENTS

| Number | Name | Date |
| --- | --- | --- |
| 415,065 | Rung | Nov. 12, 1889 |
| 487,544 | Simon | Dec. 6, 1892 |
| 625,020 | Chappuis | May 16, 1899 |
| 651,180 | Bush et al. | June 5, 1900 |

FOREIGN PATENTS

| Number | Country | Date |
| --- | --- | --- |
| 114,156 | Switzerland | of 1926 |